United States Patent

[11] 3,622,247

| [72] | Inventors | Myron L. Greenberg<br>2375 Circle Drive, Union Lake, Mich. 48085;<br>Daniel J. Kolesar, 4455 Sudbury, Warren, Mich. 48092 |
|---|---|---|
| [21] | Appl. No. | 811,754 |
| [22] | Filed | Apr. 1, 1969 |
| [45] | Patented | Nov. 23, 1971 |

[54] BORING METHOD
6 Claims, 3 Drawing Figs.

[52] U.S. Cl. .................................................. 408/147
[51] Int. Cl. ...................................................... B23b 39/00, B23b 29/02
[50] Field of Search ........................................ 77/1, 3, 56–58, DIG. 4; 308/DIG. 1; 408/147

[56] References Cited
UNITED STATES PATENTS

| 2,663,977 | 12/1953 | Gerard et al. ................. | 77/DIG. 4 |
| 3,418,025 | 12/1968 | Hucks et al. .................. | 77/DIG. 4 |
| 3,461,752 | 8/1969 | Kielas et al. .................. | 308/9 X |
| 3,466,952 | 9/1969 | Greenberg et al. ........... | 77/1 |
| 3,496,806 | 1/1970 | Porath........................... | 77/3 |
| 3,233,480 | 2/1966 | Briney, Jr. et al............. | 77/58.34 |

Primary Examiner—Andrew R. Ruhasz
Assistant Examiner—Leon Gilden
Attorney—Barnes, Kisselle, Raisch and Choate

ABSTRACT: A method and apparatus for finish boring a bore in a workpiece wherein a tool is moved axially and rotated with respect to the bore to take a first cut and is thereafter moved radially outwardly and retracted axially while rotating the tool relative to the workpiece to provide a finish cut resulting in a finished bore.

PATENTED NOV 23 1971

INVENTORS
MYRON L. GREENBERG
DANIEL J. KOLESAR
BY
Barnes, Kisselle, Raisch & Choate
ATTORNEYS INVENTORS
MYRON L. GREENBERG
DANIEL J. KOLESAR
BY
Barnes, Kisselle, Raisch & Choate
ATTORNEYS

3,622,247

BORING METHOD

BACKGROUND OF THE INVENTION

In boring of deep or shallow openings in workpieces with a single-point tool it is conventional to provide relative motion axially between the workpiece and the tool and to cause relative rotation between the workpiece and tool to form the opening. In moving the tool to form the bore, there is a natural tendency for the tool to have a springback which provides sufficient force to cause the tool to make an undesirable additional cut upon retraction.

It is common, in such operations as for instance automotive cylinder boring, to utilize what is called "in-and-out boring," in which we bore in and then reverse the feed and bore out with the same tool. However, this is still subject to errors, particularly since we cannot actually control the amount of springback of the tool and boring bar during either cut, but must rely on the springback during the finish cut being negligible.

Among the objects of the present invention are to provide a novel method and apparatus for finish boring of the rough bore in a workpiece; which method and apparatus is relatively simple, rapid, efficient and produces controllable and accurate results.

SUMMARY OF THE INVENTION

A method and apparatus for finish boring a bore in a workpiece wherein a tool is moved axially and rotated with respect to the bore to take a first cut and is thereafter moved radially outwardly and retracted axially while rotating the tool relative to the workpiece to provide a finish cut resulting in a finished bore.

DESCRIPTION

Figure 1:
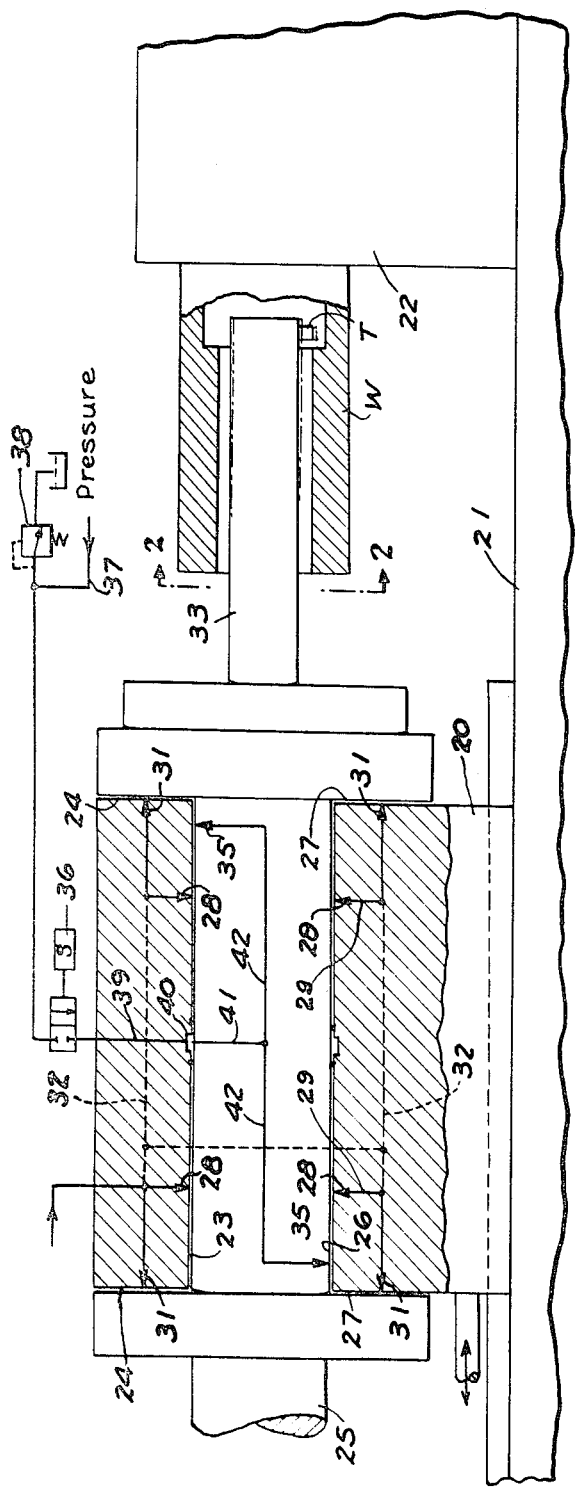
FIG. 1 is a partly diagrammatic sectional view of an apparatus embodying the invention.
Figure 2:
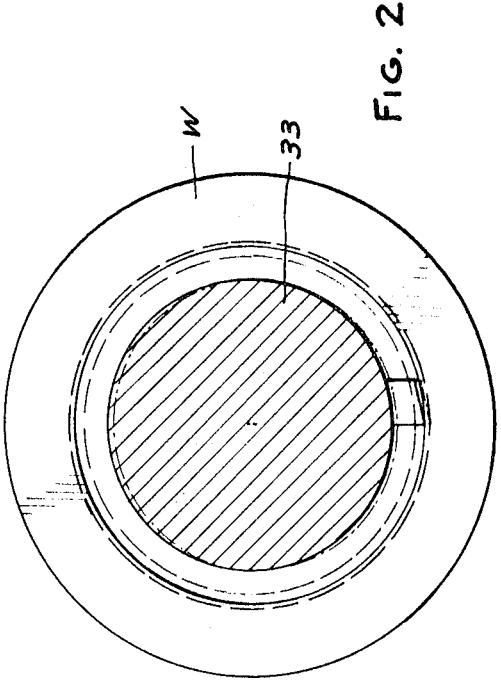
FIG. 2 is a partly diagrammatic sectional view taken along the line 2—2 in FIG. 1.
Figure 3:
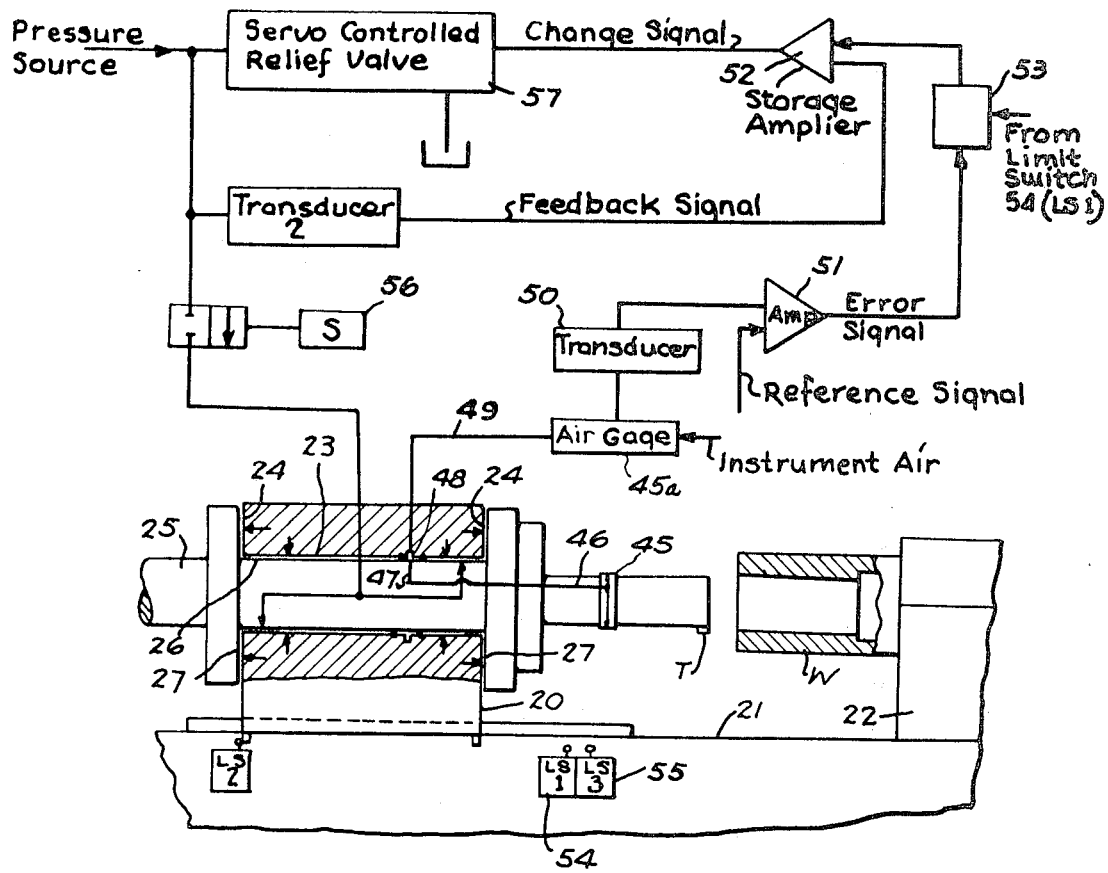
FIG. 3 is a diagrammatic view of a further modified form of the invention.

Referring to FIGS. 1-3, the boring apparatus shown therein comprises a base 20 that is movable along a slide 21 toward and away from a workpiece holder 22 that supports a workpiece W. Base 20 is formed with an accurate cylindrical surface 23 and radial surfaces 24. A spindle or tool support 25 is rotatably mounted in the base 20 and includes a complementary cylindrical surface 26 and radial surfaces 27.

The cylindrical surface 23 of the base 20 is formed with two sets of circumferentially spaced pressure pads or recesses 28, each of which has a restrictor which may be in the form of a capillary tube or the like associated therewith. Fluid is adapted to be supplied through inlets 29 to each of the pressure pads. For clarity, the pressure pads and associated restrictors are represented by arrows.

Each of the radial surfaces 24 of the base 20 is formed with circumferentially spaced pressure pads or recesses 31, each of which has a restrictor associated therewith and to which fluid is supplied through an axial interconnecting passage 32 that extends from the radial passage 29.

When fluid such as oil is supplied continuously to the pressure pads 28, 31, it flows in a thin film between the surfaces 23, 26 and 24, 27 to maintain the spindle 25 in accurate, stable, low friction relation to the base 20. The spindle 25 has a tool support 33 thereon which supports a tool T that forms or finishes the bore of the workpiece W. The relative dimensions of the adjacent surfaces of the base 20 and spindle 25 are such that a film of liquid flows continuously at low velocity between the surfaces and the pressure of the liquid drops to zero as it leaves the surfaces. The number and size of the pressure pads are such as to support the load on the spindle 25 and will vary depending upon the size of the load to be supported. A minimum of three circumferentially spaced pads is required on journal surfaces although fewer can be used on thrust (radial) surfaces. The space between the surfaces 23, 26 and 24, 27 may range between 0.002 of an inch and 0.0001 of an inch. In larger size spindles or where machining limitations prevent obtaining uniform control of dimensions, satisfactory results will be achieved provided that at least some portions of the spaces between the surfaces are within the above limits.

The spindle 25 is adapted to be rotated with respect to the workpiece in order to perform a cutting action on the workpiece. The spindle heretofore defined is of the type disclosed and claimed in the patent to Porath U.S. Pat. No. 3,223,463 and further disclosed in U.S. application Ser. No. 688,415 filed Dec. 6, 1967 in the names of Myron L. Greenberg and Gordon H. Porath.

In accordance with the invention, the spindle 25 is provided with diametrically opposed pads and associated restrictors 35 which are oriented with respect to the tool T in a fashion such that if fluid were applied to the pressure pads the tool would be moved radially outwardly with respect to the workpiece W.

The application of fluid to the pressure pads 35 and associated restrictors is controlled by a solenoid valve 36 to which fluid is supplied from a source of pressure through a line 37 having a pressure relief valve 38 thereon. The fluid flows through a passage 39 to an isolated annulus 40 and thereafter through one or more radial passages 41 and axial passages 42 to the pressure pads 35.

In accordance with the invention, the tool T is brought into position adjacent the workpiece and moved axially with respect to the workpiece and simultaneously rotated to take a rough cut from the bore of the workpiece. The solenoid valve 36 is then energized to apply pressure to the pressure pads 35 displacing the tool T radially outwardly to the desired finished diameter. Tool T is then moved axially in the opposite direction and simultaneously rotated to take a second and final finish cut which finishes the bore of the workpiece.

Referring to FIG. 3, the apparatus may be provided for automatically controlling the position of the tool. In this form of the invention an air gage head 45 is supplied with fluid through an axial line 46, radial passage 47, annulus 48 and line 49. The air gage 45a functions through a transducer 50 to provide a signal corresponding to the diameter of the bore. This signal is compared with a reference signal is an amplifier 51 and stored in an amplifier 52 after passing through a gate 53 actuated by limit switch 54 (LS1) which in turn is actuated by movement of the tool support toward the workpiece. Upon completion of the rough cut, limit switch 55 (LS3) is actuated to energize solenoid 56 permitting a fluid pressure controlled by valve 57 to be applied to the pressure pads 35. The magnitude of the fluid pressure is controlled by the signal from the storage amplifier 52 which is applied to a servocontrol relief valve 57. As in the previous form of the invention, the tool T is moved axially to take a rough cut and thereafter returned in the opposite direction to take a finish cut, the diameter of the finish cut being controlled by the signal from the air gage 45 which has been compared with the predetermined standard or reference signal.

We claim:

1. In a boring apparatus, the combination comprising
a tool support having means thereon for supporting a tool,
a base,
said tool support and said base having complementary surfaces,
one of said surfaces having at least one set of circumferentially spaced pressure pads therein,
a restrictor associated with each said pressure pad,
means for supplying fluid to each said restrictor,
means for moving said tool support and workpiece relative to one another,
a pressure pad in said tool support oriented circumferentially with respect to said tool, and means for supplying additional fluid to said pressure pad on said tool support for displacing the tool support radially with respect to the axis of the support in the manner to move the tool radially outwardly with respect to the workpiece, means for measuring the diameter of the bore in the workpiece after the tool has moved axially in one direction, and means responsive to said last-mentioned means for controlling the application of fluid to said last-mentioned pressure pad and thereby controlling the radially outward movement of the tool with respect to the workpiece.

2. In a boring apparatus, the combination comprising a tool support having means thereon for supporting a boring tool, a base, said tool support and said base having complementary surfaces, one of said surfaces having at least one set of circumferentially spaced pressure pads therein, a restrictor associated with each said pressure pad, means for supplying fluid to each said restrictor, means for moving said tool support and workpiece axially and rotating them relative to one another to produce a rough cut when the tool and workpiece are moved relatively in one axial direction, 3. The combination set forth in claim 2 including means for applying said fluid to said last-mentioned pressure pad in response to relative axial movement of said tool and workpiece.

4. The combination set forth in claim 1 wherein said last-mentioned means comprises comparison means for comparing said diameter with a predetermined standard.

5. The combination set forth in claim 1 wherein said last-mentioned means comprises means for creating a first signal in response to the diameter measuring means, means for comparing said first signal with a predetermined standard, and means for controlling the flow of fluid to said pressure pad in response to said comparison.

6. The combination set forth in claim 5 including means for storing said diameter signal until such time as the tool has moved axially in one direction through said workpiece.

* * * * *